S. TROOD.
FLUID FLOW METER.
APPLICATION FILED JAN. 7, 1914.
1,185,736.
Patented June 6, 1916.
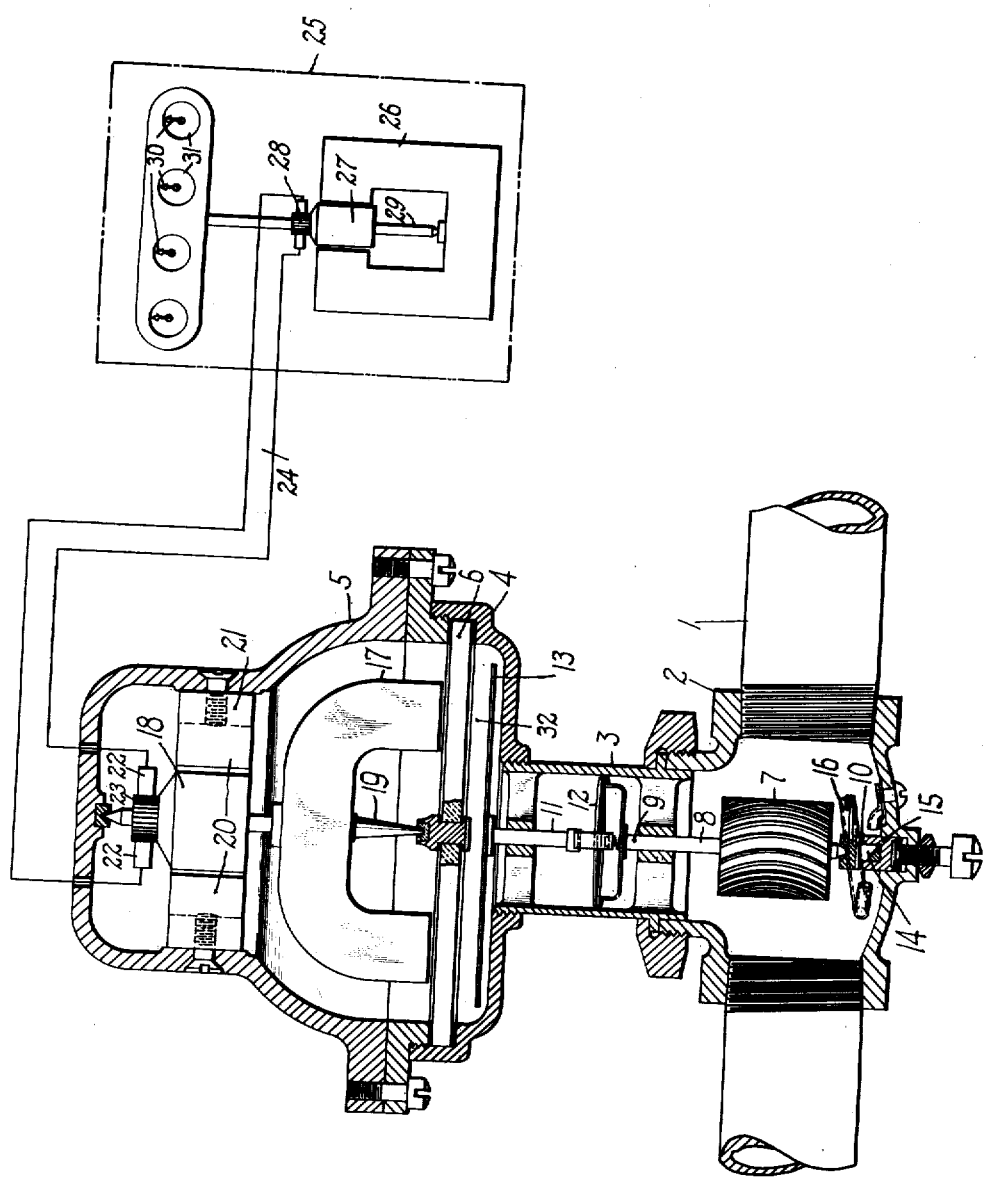

UNITED STATES PATENT OFFICE.

SAMUEL TROOD, OF WILKINSBURG, PENNSYLVANIA, ASSIGNOR TO WESTINGHOUSE ELECTRIC AND MANUFACTURING COMPANY, A CORPORATION OF PENNSYLVANIA.

FLUID-FLOW METER.

1,185,736. Specification of Letters Patent. Patented June 6, 1916.

Application filed January 7, 1914. Serial No. 810,774.

*To all whom it may concern:*

Be it known that I, SAMUEL TROOD, a citizen of the United States, and a resident of Wilkinsburg, in the county of Allegheny and State of Pennsylvania, have invented a new and useful Improvement in Fluid-Flow Meters, of which the following is a specification.

My invention relates to fluid-flow meters and particularly to electrically operated types of such meters.

My invention has for its object to provide a portable and switchboard type of fluid-flow meter which corrects for the temperature and pressure of the fluid being measured.

In my co-pending application, Serial No. 793,117, a steam-flow meter which corrects for temperature and pressure variations is described. This meter has the advantage that it must be inserted in the steam line which is usually located a considerable distance from a central control or switchboard. In my present invention, I provide means for so arranging the essential features of a fluid-flow meter that its indicating devices may be located upon a switchboard or other convenient place remotely located with respect to the conduit in which the fluid to be measured flows.

The single figure of the accompanying drawing is a view partially in section, partially in elevation and partially in diagram, of a fluid-flow meter embodying my invention.

A pipe 1 in which the fluid flows that is to be measured is provided with a coupling or union 2. A pipe 3 is inserted in the union 2 and is screw-threaded at its upper end to receive the lower bell-shaped member 4 of the fluid-flow meter. To the member 4 is attached the upper member 5, and the chamber formed thereby is separated from that formed by the lower member 4 by a glass or other non-metallic diaphragm 6. In the pipe 3 and the union 2 is the fluid compartment in which is located a turbine wheel 7 that is mounted upon the lower portion 8 of a shaft 9. The shaft 9 is supported by an adjustable lower bearing 10, substantially as shown. The upper portion 11 of the shaft 9 is separated from the lower portion 8 of the same by a thermostat 12, and a disk 13 is attached to its upper end for purposes hereinafter described. The bearing 10 has a bottom projection 14 which is formed into a cam on its lower surface to fit into an adjustable cup 15 similarly formed. A sealed Bourdon gage tube 16 is attached, at its upper end, to the movable bearing 10 and, at its lower end, to the base of the coupling 2 for reasons hereinafter set forth.

The glass diaphragm 6 supports a shaft 19 upon which is mounted a U-magnet 17 and an armature 18, the latter of which rotates between the poles 20 of a permanent magnet 21. Brushes 22 bear upon the commutator cylinder 23 and transmit electric current from the windings on the armature 18 through the conductors 24 to an electrical instrument 25 which comprises a permanent magnet 26, an armature 27, a commutator 28 and a shaft 29 for operating an integrating mechanism having a plurality of pointers and dials 30 and 31, respectively.

When the fluid flows through the pipe 1, the turbine wheel 7 rotates with a speed that is directly proportional to the velocity of the fluid, thus driving the disk 13 which causes the U-magnet 17 to rotate by reason of the eddy currents produced in the disk by the flux from the magnet with a definite slip depending upon the width of the air gap 32 between the disk and the magnet. The armature 18 is thus rotated, and an electromotive force is generated in the windings thereof which causes a current to flow through the conductors 24 to the armature 27 of the instrument 25 for the purpose of rotating the shaft 29 in proportion to the velocity of the fluid. If the pressure of the fluid increases, the Bourdon gage 16 will contract, and thus raise the bearing 10 and with it the disk 13, thereby decreasing the width of the air gap 32 and causing the U-magnet to run with less slip. Hence, the speed of the shaft 29 is increased, as is readily understood. If the temperature of the fluid increases, the thermostat 12 expands and since the portion 11 of the shaft is directly connected to the lower surface of the thermostat the disk 13 moves downwardly, thus increasing the width of the air gap 32, and, consequently, the slip of the U-magnet 17 to cause a corresponding decrease in the speed of the shaft 29, as is understood by those versed in the art. Therefore, the shaft 29 will have a speed which is proportional to the voltage impressed on the armature 27 less the voltage drop in the armature. Thus the integrating mechanism may be so proportioned as to register in accordance with the velocity, pressure and temperature of the fluid.

The plurality of pointers 30 indicate on the disks 31 the flow of the fluid in any desirable units, as will be readily understood. The electrical generator and motors may be of any desired type, those herein described being shown for the purpose of simplifying the description.

While I have described the device in its preferred form, I desire that only such limitations shall be imposed as do not depart from the spirit and scope of my invention as defined in the appended claims.

I claim as my invention:

1. The combination with a fluid-flow meter comprising a generator adapted to operate in accordance with the velocity of the fluid and having means for controlling its speed in accordance with the pressure and temperature of the fluid, of an electro-responsive device operatively connected to the generator and adapted to indicate in accordance with the potential generated by the generator.

2. In a fluid measuring device, the combination with a generator actuated in accordance with the velocity of the fluid and having means for controlling its speed in accordance with the pressure and temperature of the fluid, of a motor remotely disposed with respect to the generator and electrically connected thereto for indicating in accordance with the speed of the generator.

3. In a fluid-measuring device, the combination with a generator and means actuated by the flowing fluid for driving the generator in accordance with the velocity of the fluid and means whereby said actuating means is controlled by the temperature of the fluid, of an electro-responsive device electrically connected to the generator for indicating in accordance with the speed of the generator.

4. In a fluid-measuring device, the combination with a generator and means actuated by the flowing fluid for driving the generator in accordance with the velocity of the fluid and means whereby the actuating means is controlled by the pressure and temperature of the fluid, of an electric motor operatively connected to the generator, and an integrating mechanism adapted to be actuated by the electric motor to indicate in accordance with the velocity, pressure and temperature of the fluid.

In testimony whereof, I have hereunto subscribed my name this 27th day of Dec. 1913.

SAMUEL TROOD.

Witnesses:
B. B. HINES,
M. C. MERZ.

drop in the armature. Thus the integrating mechanism may be so proportioned as to register in accordance with the velocity, pressure and temperature of the fluid.

The plurality of pointers 30 indicate on the disks 31 the flow of the fluid in any desirable units, as will be readily understood. The electrical generator and motors may be of any desired type, those herein described being shown for the purpose of simplifying the description.

While I have described the device in its preferred form, I desire that only such limitations shall be imposed as do not depart from the spirit and scope of my invention as defined in the appended claims.

I claim as my invention:

1. The combination with a fluid-flow meter comprising a generator adapted to operate in accordance with the velocity of the fluid and having means for controlling its speed in accordance with the pressure and temperature of the fluid, of an electro-responsive device operatively connected to the generator and adapted to indicate in accordance with the potential generated by the generator.

2. In a fluid measuring device, the combination with a generator actuated in accordance with the velocity of the fluid and having means for controlling its speed in accordance with the pressure and temperature of the fluid, of a motor remotely disposed with respect to the generator and electrically connected thereto for indicating in accordance with the speed of the generator.

3. In a fluid-measuring device, the combination with a generator and means actuated by the flowing fluid for driving the generator in accordance with the velocity of the fluid and means whereby said actuating means is controlled by the temperature of the fluid, of an electro-responsive device electrically connected to the generator for indicating in accordance with the speed of the generator.

4. In a fluid-measuring device, the combination with a generator and means actuated by the flowing fluid for driving the generator in accordance with the velocity of the fluid and means whereby the actuating means is controlled by the pressure and temperature of the fluid, of an electric motor operatively connected to the generator, and an integrating mechanism adapted to be actuated by the electric motor to indicate in accordance with the velocity, pressure and temperature of the fluid.

In testimony whereof, I have hereunto subscribed my name this 27th day of Dec. 1913.

SAMUEL TROOD.

Witnesses:
B. B. HINES,
M. C. MERZ.

---

Correction in Letters Patent No. 1,185,736.

It is hereby certified that in Letters Patent No. 1,185,736, granted June 6, 1916, upon the application of Samuel Trood, of Wilkinsburg, Pennsylvania, for an improvement in "Fluid-Flow Meters," an error appears in the printed specification requiring correction as follows: Page 1, line 20, for the word "advantage" read *disadvantage;* and that the said Letters Patent should be read with this correction therein that the same may conform to the record of the case in the Patent Office.

Signed and sealed this 25th day of July, A. D., 1916.

[SEAL.]

F. W. H. CLAY,
*Acting Commissioner of Patents.*

Cl. 73—167.

It is hereby certified that in Letters Patent No. 1,185,736, granted June 6, 1916, upon the application of Samuel Trood, of Wilkinsburg, Pennsylvania, for an improvement in "Fluid-Flow Meters," an error appears in the printed specification requiring correction as follows: Page 1, line 20, for the word "advantage" read *disadvantage;* and that the said Letters Patent should be read with this correction therein that the same may conform to the record of the case in the Patent Office.

Signed and sealed this 25th day of July, A. D., 1916.

[SEAL.]

F. W. H. CLAY,
*Acting Commissioner of Patents.*

Cl. 73—167.